(12) United States Patent
Oliva (10) Patent No.: US 12,065,083 B2
(45) Date of Patent: Aug. 20, 2024

(54) VEHICLE INTERFACED SMARTPHONE CONTROL DEVICE

(71) Applicant: Michael Oliva, West Babylon, NY (US)

(72) Inventor: Michael Oliva, West Babylon, NY (US)

(*) Notice: Subject to any disclaimer, the term of this patent is extended or adjusted under 35 U.S.C. 154(b) by 426 days.

(21) Appl. No.: 17/552,106

(22) Filed: Dec. 15, 2021

(65) Prior Publication Data

US 2023/0182653 A1    Jun. 15, 2023

(51) Int. Cl.
| | |
|---|---|
| *B60W 10/00* | (2006.01) |
| *B60R 11/02* | (2006.01) |
| *H04B 1/3822* | (2015.01) |
| *H04B 1/3877* | (2015.01) |
| *H04M 1/04* | (2006.01) |
| *B60K 31/00* | (2006.01) |
| *B60R 11/00* | (2006.01) |

(52) U.S. Cl.
CPC ........ *B60R 11/0241* (2013.01); *H04B 1/3822* (2013.01); *H04B 1/3877* (2013.01); *H04M 1/04* (2013.01); *B60K 2031/0091* (2013.01); *B60R 2011/0005* (2013.01); *B60R 2011/0063* (2013.01); *B60R 2011/0071* (2013.01); *B60R 2011/0075* (2013.01)

(58) Field of Classification Search
CPC ......... B60R 11/0241; B60R 2011/0005; B60R 2011/0063; B60R 2011/0071; B60R 2011/0075; H04B 1/3822; H04B 1/3877; H04M 1/04; H04M 1/724098; H04M 1/72463; B60K 2031/0091; B60W 10/00

USPC .......................................................... 701/93
See application file for complete search history.

(56) References Cited

U.S. PATENT DOCUMENTS

| | | | |
|---|---|---|---|
| D714,772 S | 10/2014 | Rozzo | |
| 9,283,931 B2 | 3/2016 | Skelton | |
| 9,432,071 B2 | 8/2016 | An | |
| 2006/0052144 A1* | 3/2006 | Seil | H04B 1/38 455/90.3 |
| 2009/0043444 A1* | 2/2009 | Gettner | G07C 5/008 701/1 |
| 2012/0214408 A1 | 8/2012 | Chronister | |

(Continued)

FOREIGN PATENT DOCUMENTS

WO    WO2016127204    8/2016

*Primary Examiner* — Shardul D Patel (57) ABSTRACT

A vehicle interfaced smartphone control device for limiting phone distraction while driving includes a docking station, which selectively engages a smartphone of a driver of a vehicle so that the smartphone is operationally engaged to the docking station. The docking station is mountable to an interior element of the vehicle so that the smartphone is accessible to the driver. The docking station is operationally engageable an electronic control module of the vehicle. First and second programming code are selectively positionable on the electronic control module and the smartphone, respectively. The first programming code enables the electronic control module to operate the vehicle with at least one operational aspect of the vehicle being limited. The second programming code enables the smartphone, when operationally engaged to the docking station, to continuously signal the electronic control module to operate the vehicle without limiting any operational aspects of the vehicle.

12 Claims, 5 Drawing Sheets

(56) References Cited

U.S. PATENT DOCUMENTS

| | | |
|---|---|---|
| 2014/0104771 A1 | 4/2014 | Colan |
| 2015/0080068 A1 | 3/2015 | Bracamontes Cruz |
| 2017/0250717 A1* | 8/2017 | Beauregard .......... H04B 1/3822 |
| 2018/0026669 A1* | 1/2018 | Edwards ................ G08B 21/06 |
| | | 455/418 |
| 2019/0351764 A1 | 11/2019 | Gil Vera |
| 2020/0079295 A1* | 3/2020 | Yamamoto .......... B60R 11/0241 |
| 2021/0063179 A1* | 3/2021 | Hayes .............. G08G 1/096775 |
| 2021/0218837 A1* | 7/2021 | Grunfeld ............... H04W 4/027 |

* cited by examiner

VEHICLE INTERFACED SMARTPHONE CONTROL DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to smartphone control devices and more particularly pertains to a new smartphone control device for limiting phone distraction while driving.

The present invention discloses is a smartphone control device for a vehicle comprising docking station for a smartphone of a driver. The docking station is engaged to an electronic control module of a vehicle via the vehicle's on-board diagnostics port. If the driver's smartphone is not seated in the docking unit, a top speed of the vehicle is limited.

(2) Description of Related Art Including Information Disclosed Under 37 CFR 1.97 and 1.98

The prior art relates to smartphone control devices. Prior art smartphone control devices may comprise docking stations engaged to ignition systems of vehicles, wherein a smartphone effectively serves as a key. What is lacking in the prior art is a smartphone control device for a vehicle comprising docking station for a smartphone of a driver. The docking station is engaged to an electronic control module of a vehicle via the vehicle's on-board diagnostics port. If the driver's smartphone is not seated in the docking unit, a top speed of the vehicle is limited.

BRIEF SUMMARY OF THE INVENTION

An embodiment of the disclosure meets the needs presented above by generally comprising a docking station, which is configured to selectively engage a smartphone of a driver of a vehicle so that the smartphone is operationally engaged to the docking station. The docking station is configured to be mountable to an interior element of the vehicle so that the smartphone is accessible to the driver. The docking station is configured to operationally engage an electronic control module of the vehicle. First programming code, which is selectively positionable on the electronic control module, enables the electronic control module to operate the vehicle in a first mode, wherein at least one operational aspect of the vehicle is limited. Second programming code, which is selectively positionable on the smartphone, enables the smartphone, when operationally engaged to the docking station, to continuously signal the electronic control module to operate the vehicle in a second mode, wherein no operational aspects of the vehicle are limited.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new smartphone control device embodying the principles and concepts of an embodiment of the disclosure and generally designated by the reference numeral 10 will be described.

Figure 1:
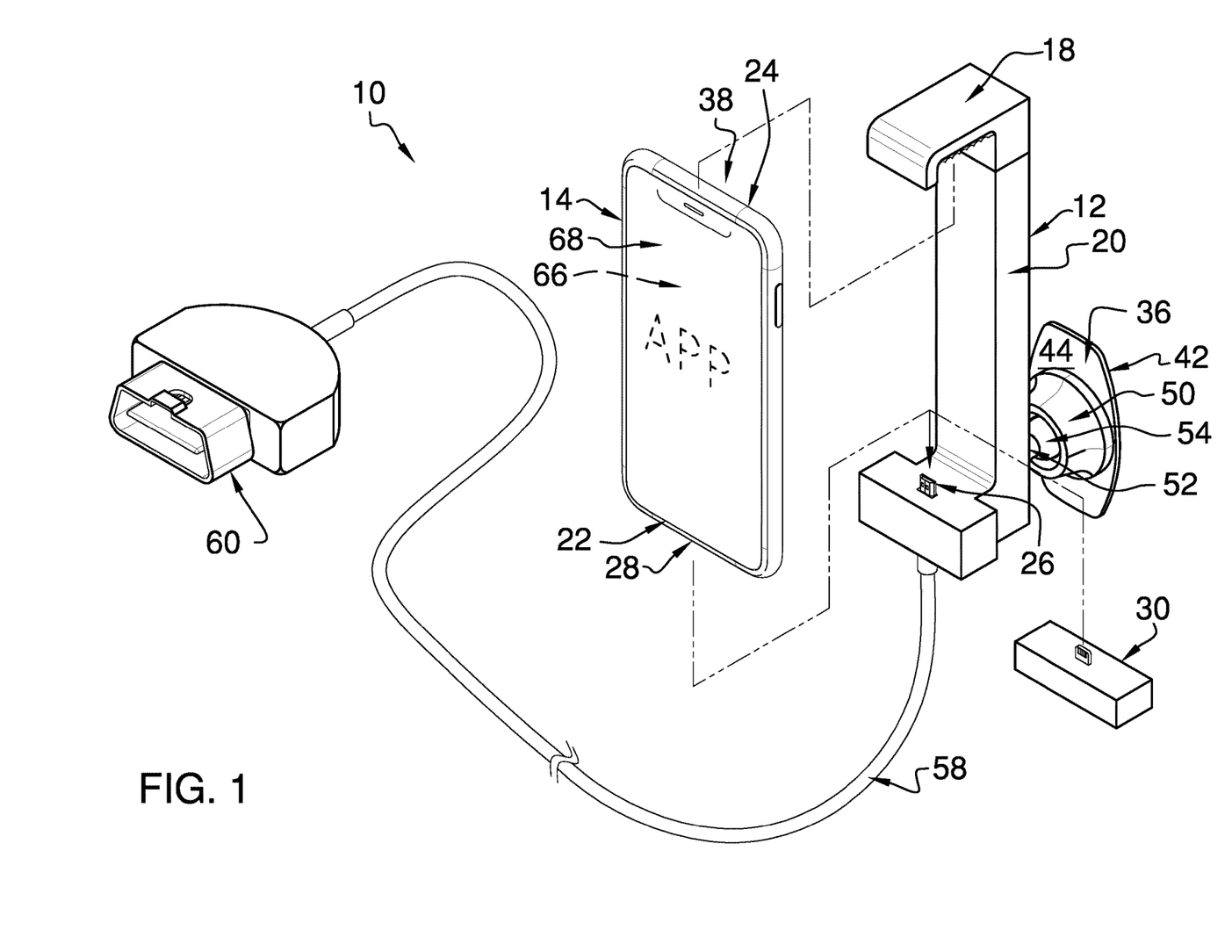
FIG. 1 is an isometric perspective view of a vehicle interfaced smartphone control device according to an embodiment of the disclosure.
Figure 2:
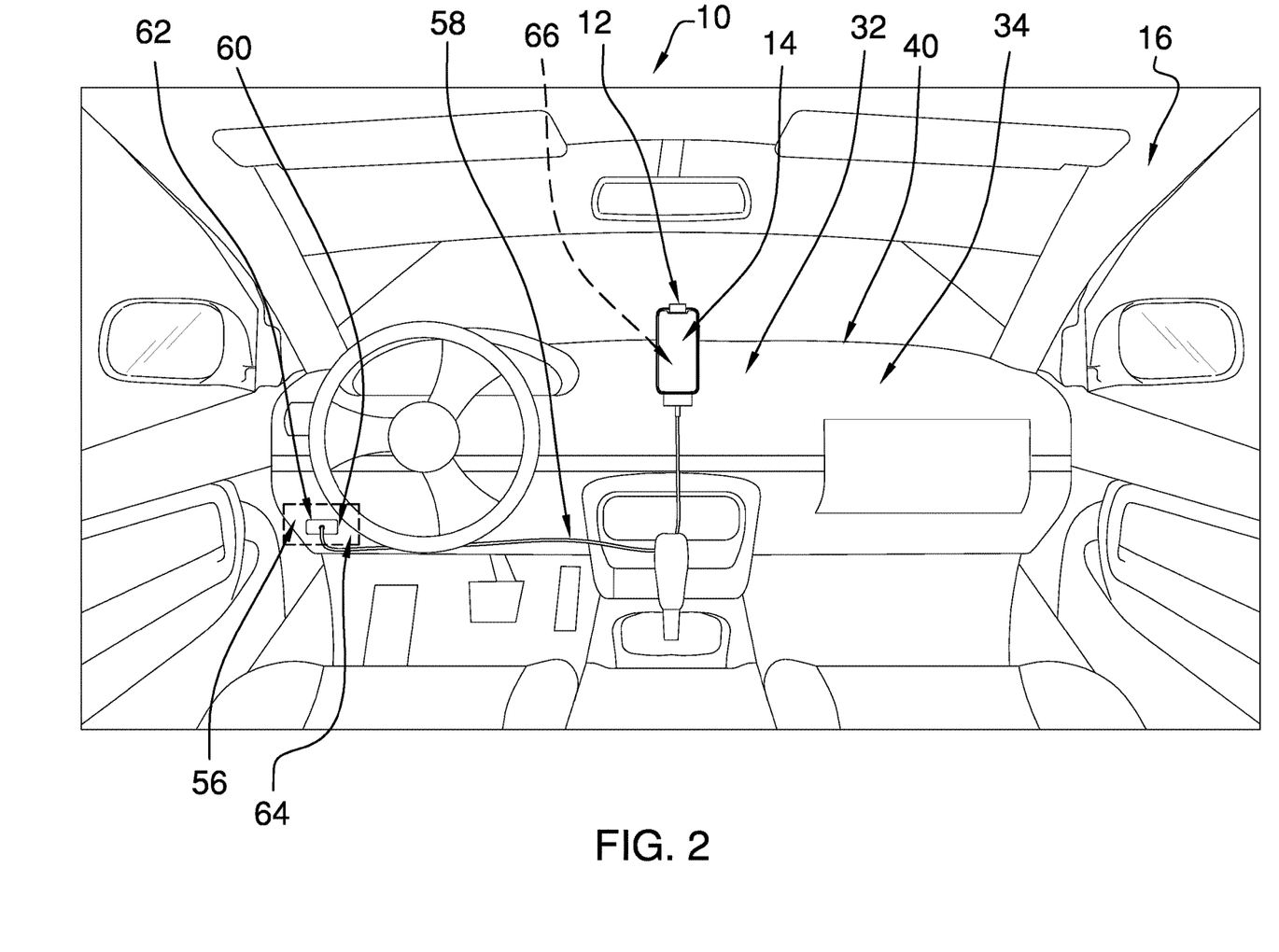
FIG. 2 is an in-use view of an embodiment of the disclosure.
Figure 3:
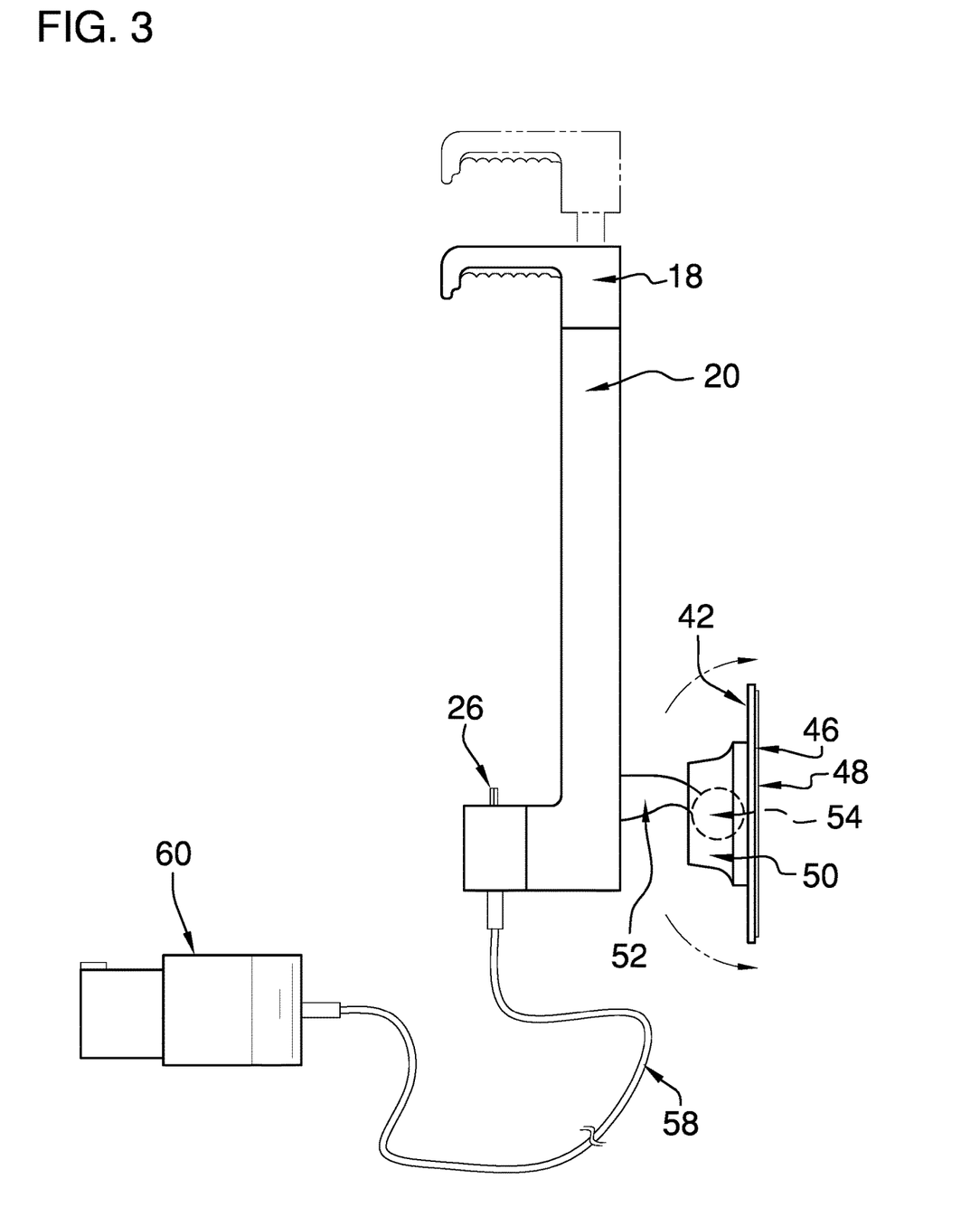
FIG. 3 is a side view of an embodiment of the disclosure.

As best illustrated in FIGS. 1 through 5, the vehicle interfaced smartphone control device 10 generally comprises a docking station 12, which is configured to selectively engage a smartphone 14, cellphone, or the like, of a driver of a vehicle 16 so that the smartphone 14 is operationally engaged to the docking station 12. The docking station 12 comprises an upper L-bracket 18, which is slidably engaged to a lower L-bracket 20 so that the upper L-bracket 18 is slidable between an open configuration and a closed configuration, as shown in FIG. 3. The lower L-bracket 20 is configured to engage a first end 22 of the smartphone 14, positioning the upper L-bracket 18 to be slid to the closed configuration to engage the upper L-bracket 18 to a second end 24 of the smartphone 14 to engage the smartphone 14 to the docking station 12.

The vehicle interfaced smartphone control device 10 also comprises a phone connector 26, which is engaged to the lower L-bracket 20. The phone connector 26 is complementary to a port 28 of the smartphone 14. The phone connector 26 is configured to be inserted into the port 28 as the lower L-bracket 20 is engaged to the smartphone 14. The vehicle interfaced smartphone control device 10 also may comprise an adapter 30, as shown in FIG. 1, which is selectively engageable to the phone connector 26. The adapter 30 is configured to adapt the phone connector 26 for a smartphone 14 having an alternatively configured phone connector 26.

The docking station 12 is configured to be mountable to an interior element 32 of the vehicle 16, such as dashboard 34, so that the smartphone 14 is accessible to the driver.

A fastener 36 is engaged to the lower L-bracket 20 and is configured to engage the interior element 32 of the vehicle 16 so that the docking station 12 is mounted to the interior element 32, with a camera 38 of the smartphone 14 being positioned above an upper limit 40 of the dashboard 34 of the vehicle 16. The camera 38 being positioned as such allows for recording of events occurring forward of the vehicle 16.

The fastener 36 may comprise a plate 42 having a first face 44, which is engaged to the lower L-bracket 20, and a second face 46 upon which adhesive 48 is positioned. The plate 42 thus is configured to adhesively engage the interior element 32. The present invention also anticipates the fastener 36 comprising other fastening means, such as, but not limited to, screws, welds, rivets, and the like.

A cup 50 is engaged to the first face 44 of the plate 42. A stem 52 is engaged to and extends from the lower L-bracket 20. A pivot ball 54 is engaged to the stem 52 distal from the lower L-bracket 20. The pivot ball 54 is positioned in the cup 50 so that the docking station 12 is pivotable relative to the interior element 32. The present invention also anticipates other means of selectively positioning the docking station 12 relative to the interior element 32, such as, but not limited to, gooseneck tubes, articulating arms, and the like.

The docking station 12 is configured to operationally engage an electronic control module 56 of the vehicle 16. A cord 58 is engaged to and extends from the lower L-bracket 20. The cord 58 is operationally engaged to the phone connector 26. An on-board diagnostics connector 60 is engaged to the cord 58 distal from the lower L-bracket 20. The on-board diagnostics connector 60 is configured to be inserted into an on-board diagnostics port 62 of the vehicle 16 so that the smartphone 14 is operationally engaged to the electronic control module 52. The present invention also anticipates the docking station 12 being engaged to the electronic control module 52 by means of a receiver (not shown), which is engageable to the on-board diagnostics port 62, and a transmitter (not shown), which is integral to the docking station 12.

Figure 4:
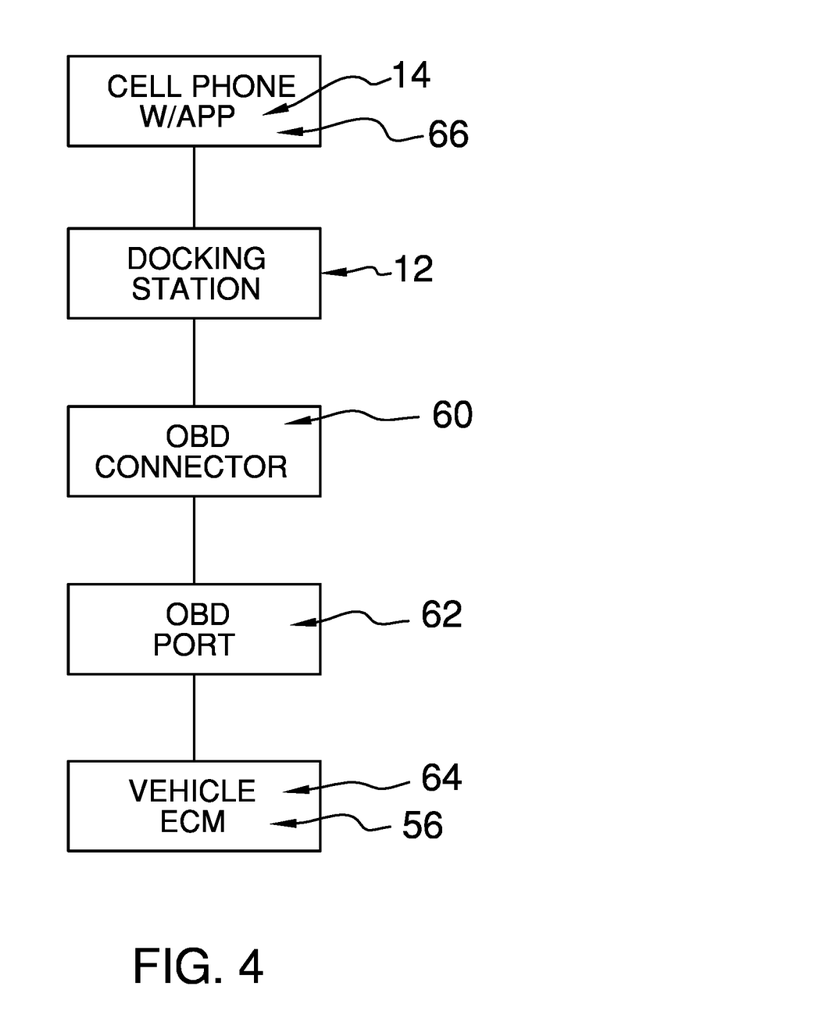
FIG. 4 is a block diagram view of an embodiment of the disclosure.

First programming code 64, which is selectively positionable on the electronic control module 56, enables the electronic control module 56 to operate the vehicle 16 in a first mode, wherein at least one operational aspect of the vehicle 16 is limited. For example, the first programming code 64 may limit a top speed of the vehicle 16. The first programming code 64 may limit the top speed of the vehicle 16 to about 20% of normal.

Second programming code 66, which is selectively positionable on the smartphone 14, enables the smartphone 14, when operationally engaged to the docking station 12, to continuously signal the electronic control module 56 to operate the vehicle 16 in a second mode, wherein no operational aspects of the vehicle 16 are limited. The second programming code 66 also may effect a blackout of a screen 68 of the smartphone 14, except when the screen 68 is providing navigational aid to the driver. The present invention also anticipates a temporary code being selectively available and positionable on an electronic device of a repair agent, or the like, who may be required to test drive the vehicle 16 without the top speed being limited.

The vehicle interfaced smartphone control device 10 is anticipated to be useful in limiting distraction to the driver caused by interaction with the smartphone 14. While driving, removal of the smartphone 14 will limit the top speed of the vehicle 16 to about 20% of normal. Smartphones 14 come equipped with interface coding, which allows automated answering of incoming calls, voice activated dialing for outgoing calls, hands free communications via use of an audio system of the vehicle 16, dictation of text messages, and the like. The present invention will encourage safe interaction between the driver and the smartphone 14, thus reducing distraction to the driver.

Figure 5:
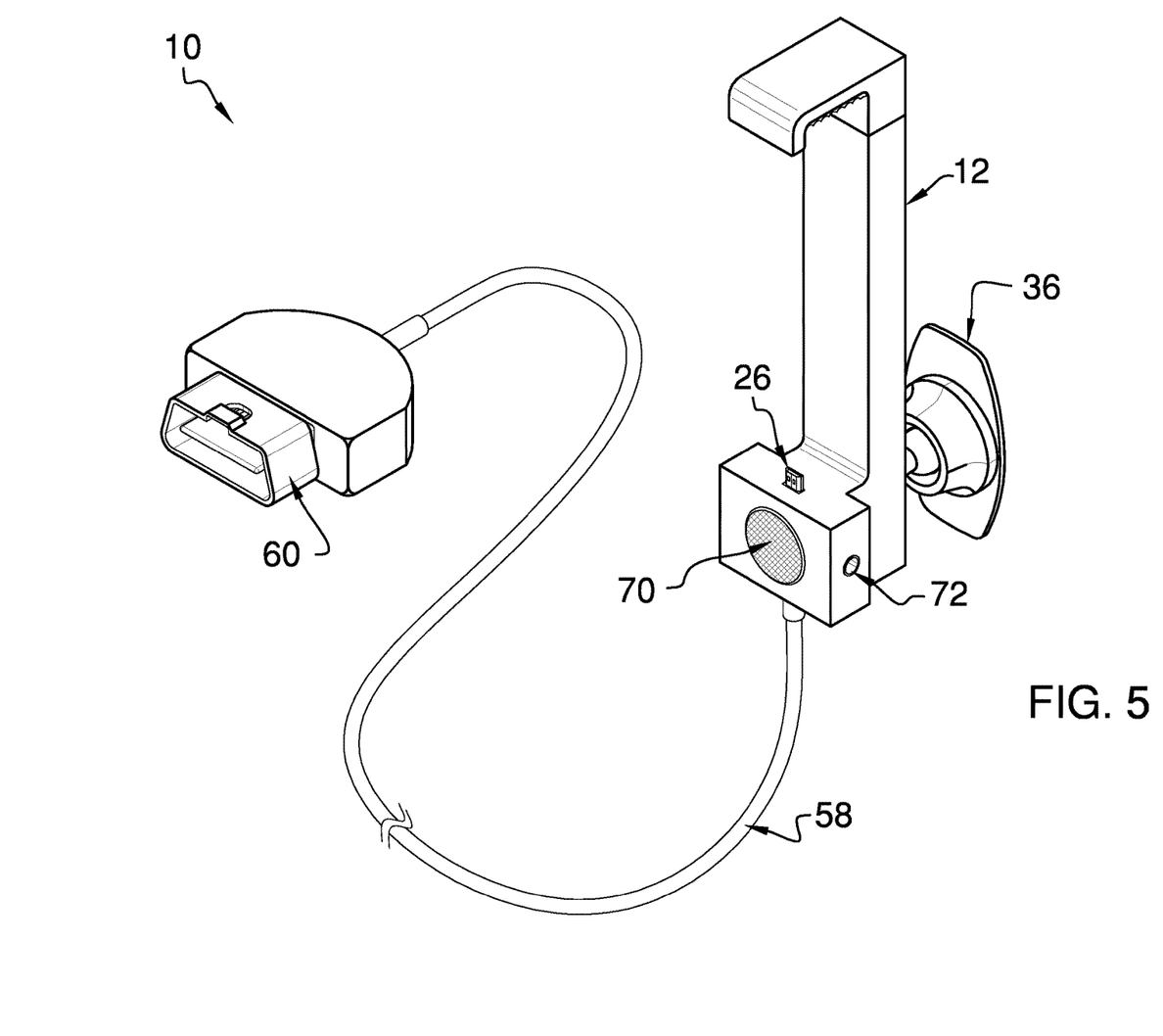
FIG. 5 is an isometric perspective view of an embodiment of the disclosure.

The present invention also anticipates a speaker 70 being engaged to the lower L-bracket 20 and operationally engaged to the phone connector 26. The speaker 70 is configured to broadcast an audio signal from the smartphone 14. This configuration would be useful for vehicles 16 that lack means for wirelessly interfacing with a smartphone 14, which precludes the smartphone 14 from broadcasting via the audio system of the vehicle 16.

An auxiliary input port 72 is engaged to the speaker 70. The auxiliary input port 72 is configured for insertion of an input plug (not shown), which is operationally engaged to an auxiliary audio player (not shown), for broadcast by the speaker 70 of an audio signal from the auxiliary audio player.

In use, the docking station 12 is mounted to an interior element 32 of the vehicle 16 using the adhesive 48. The docking station 12 is operationally engaged to the electronic control module 56 of the vehicle 16 by inserting the on-board diagnostics connector 60 into the on-board diagnostics port 62. The smartphone 14 of the driver of the vehicle 16 then is operationally engaged to the docking station 12. Should the driver remove the smartphone 14 from the docking station 12 while driving, the smartphone 14 will no longer continuously signal the electronic control module 56, resulting in the top speed of the vehicle 16 being limited.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle interfaced smartphone control device comprising:
a docking station configured for selectively engaging a smartphone of a driver of a vehicle, such that the smartphone is operationally engaged to the docking station, the docking station being configured to be mountable to an interior element of the vehicle, such that the smartphone is accessible to the driver, the docking station being configured for operationally engaging an electronic control module of the vehicle;
first programming code selectively positionable on the electronic control module enabling the electronic control module for operating the vehicle in a first mode wherein at least one operational aspect of the vehicle is limited; and
second programming code selectively positionable on the smartphone enabling the smartphone, when operationally engaged to the docking station, to continuously signal the electronic control module for operating the vehicle in a second mode wherein no operational aspects of the vehicle are limited.

2. The vehicle interfaced smartphone control device of claim 1, wherein the docking station comprises:
an upper L-bracket slidably engaged to a lower L-bracket, such that the upper L-bracket is slidable between an open configuration and a closed configuration, wherein the lower L-bracket is configured for engaging a first end of the smartphone, positioning the upper L-bracket for sliding to the closed configuration for engaging the upper L-bracket to a second end of the smartphone for engaging the smartphone to the docking station;
a phone connector engaged to the lower L-bracket, the phone connector being complementary to a port of the smartphone, wherein the phone connector is configured for inserting into the port as the lower L-bracket is engaged to the smartphone;
a fastener engaged to the lower L-bracket and being configured for engaging the interior element of the vehicle, such that the docking station is mounted to the interior element with a camera of the smartphone being positioned above an upper limit of a dashboard of the vehicle;
a cord engaged to and extending from the lower L-bracket, the cord being operationally engaged to the phone connector; and
an on-board diagnostics connector engaged to the cord distal from the lower L-bracket, wherein the on-board diagnostics connector is configured for insertion into an on-board diagnostics port of the vehicle, such that the smartphone is operationally engaged to the electronic control module.

3. The vehicle interfaced smartphone control device of claim 2, further including an adapter selectively engageable to the phone connector, wherein the adapter is configured for adapting the phone connector for a smartphone having an alternatively configured phone connector.

4. The vehicle interfaced smartphone control device of claim 2, wherein the fastener comprises a plate having a first face engaged to the lower L-bracket and a second face upon which adhesive is positioned, wherein the plate is configured for adhesively engaging the interior element.

5. The vehicle interfaced smartphone control device of claim 4, further including:
a cup engaged to the first face of the plate;
a stem engaged to and extending from the lower L-bracket; and
a pivot ball engaged to the stem distal from the lower L-bracket, the pivot ball being positioned in the cup, such that the docking station is pivotable relative to the interior element.

6. The vehicle interfaced smartphone control device of claim 1, wherein the first programming code limits a top speed of the vehicle.

7. The vehicle interfaced smartphone control device of claim 6, wherein the first programming code limits the top speed of the vehicle to about 20% of normal.

8. The vehicle interfaced smartphone control device of claim 1, wherein the second programming code effects a blackout of a screen of the smartphone except when the screen is providing navigational aid to the driver.

9. The vehicle interfaced smartphone control device of claim 2, further including a speaker engaged to the lower L-bracket and operationally engaged to the phone connector, wherein the speaker is configured for broadcasting an audio signal from the smartphone.

10. The vehicle interfaced smartphone control device of claim 9, further including an auxiliary input port engaged to the speaker, wherein the auxiliary input port is configured for insertion of an input plug operationally engaged to an auxiliary audio player for broadcast by the speaker of an audio signal from the auxiliary audio player.

11. A vehicle interfaced smartphone control system comprising:
a vehicle;
a docking station mounted to an interior element of the vehicle, the docking station being operationally engaged to an electronic control module of the vehicle;
a smartphone of a driver of the vehicle being operationally engaged to the docking station;
first programming code positioned on the electronic control module enabling the electronic control module for operating the vehicle in a first mode wherein at least one operational aspect of the vehicle is limited; and
second programming code positioned on the smartphone enabling the smartphone, when operationally engaged to the docking station, to continuously signal the electronic control module for operating the vehicle in a second mode wherein no operational aspects of the vehicle are limited.

12. A vehicle interfaced smartphone control device comprising:
a docking station configured for selectively engaging a smartphone of a driver of a vehicle, such that the smartphone is operationally engaged to the docking station, the docking station being configured to be mountable to an interior element of the vehicle, such that the smartphone is accessible to the driver, the docking station being configured for operationally engaging an electronic control module of the vehicle, the docking station comprising:
an upper L-bracket slidably engaged to a lower L-bracket, such that the upper L-bracket is slidable between an open configuration and a closed configuration, wherein the lower L-bracket is configured for engaging a first end of the smartphone, positioning the upper L-bracket for sliding to the closed configuration for engaging the upper L-bracket to a second end of the smartphone for engaging the smartphone to the docking station,
a phone connector engaged to the lower L-bracket, the phone connector being complementary to a port of the smartphone, wherein the phone connector is configured for inserting into the port as the lower L-bracket is engaged to the smartphone, an adapter selectively engageable to the phone connector, wherein the adapter is configured for adapting the phone connector for a smartphone having an alternatively configured phone connector, a fastener engaged to the lower L-bracket and being configured for engaging the interior element of the vehicle, such that the docking station is mounted to the interior element with a camera of the smartphone being positioned above an upper limit of a dashboard of the vehicle, the fastener comprising a plate having a first face engaged to the lower L-bracket and a second face upon which adhesive is positioned, wherein the plate is configured for adhesively engaging the interior element, a cup engaged to the first face of the plate, a stem engaged to and extending from the lower L-bracket, a pivot ball engaged to the stem distal from the lower L-bracket, the pivot ball being positioned in the cup, such that the docking station is pivotable relative to the interior element, a cord engaged to and extending from the lower L-bracket, the cord being operationally engaged to the phone connector, and an on-board diagnostics connector engaged to the cord distal from the lower L-bracket, wherein the on-board diagnostics connector is configured for insertion into an on-board diagnostics port of the vehicle, such that the smartphone is operationally engaged to the electronic control module;

first programming code selectively positionable on the electronic control module enabling the electronic control module for operating the vehicle in a first mode wherein at least one operational aspect of the vehicle is limited, the first programming code limiting a top speed of the vehicle to about 20% of normal;

second programming code selectively positionable on the smartphone enabling the smartphone, when operationally engaged to the docking station, to continuously signal the electronic control module for operating the vehicle in a second mode wherein no operational aspects of the vehicle are limited, the second programming code effecting a blackout of a screen of the smartphone except when the screen is providing navigational aid to the driver;

a speaker engaged to the lower L-bracket and operationally engaged to the phone connector, wherein the speaker is configured for broadcasting an audio signal from the smartphone; and an auxiliary input port engaged to the speaker, wherein the auxiliary input port is configured for insertion of an input plug operationally engaged to an auxiliary audio player for broadcast by the speaker of an audio signal from the auxiliary audio player.

\* \* \* \* \*